United States Patent [19]

Sumino

[11] Patent Number: 5,222,594
[45] Date of Patent: Jun. 29, 1993

[54] TWIST CORRECTION DEVICE FOR PIPE CONVEYOR

[75] Inventor: Shinichi Sumino, Yokohama, Japan

[73] Assignee: Bridgestone Corporation, Tokyo, Japan

[21] Appl. No.: 861,307

[22] Filed: Mar. 31, 1992

[30] Foreign Application Priority Data

Apr. 2, 1991 [JP] Japan .................................. 3-94975
Oct. 17, 1991 [JP] Japan ................................. 3-296690

[51] Int. Cl.⁵ .............................................. B65G 39/16
[52] U.S. Cl. .................................. 198/808; 198/807; 198/819
[58] Field of Search ............... 198/806, 809, 808, 819, 198/823, 826

[56] References Cited

U.S. PATENT DOCUMENTS

| | | | |
|---|---|---|---|
| 1,815,099 | 7/1931 | Foote | 198/808 |
| 3,001,680 | 9/1961 | Nitkiewicz | |
| 3,303,924 | 2/1967 | Hartzell, Jr. | 198/808 X |
| 4,402,395 | 9/1983 | Hashimoto | 198/807 |
| 4,625,860 | 12/1986 | Kawasaki et al. | 198/819 |
| 5,042,646 | 8/1991 | Beatty | 198/819 |

FOREIGN PATENT DOCUMENTS

| | | | |
|---|---|---|---|
| 0301454 | 2/1989 | European Pat. Off. | 198/808 |
| 0448067 | 9/1991 | European Pat. Off. | 198/819 |
| 0269367 | 6/1989 | Fed. Rep. of Germany | 198/808 |
| 0151508 | 9/1982 | Japan | 198/819 |
| 0149211 | 8/1984 | Japan | 198/819 |
| 1033031 | 6/1966 | United Kingdom | |
| 2092977 | 8/1982 | United Kingdom | |
| 2132970 | 7/1984 | United Kingdom | 198/819 |

Primary Examiner—D. Glenn Dayoan
Assistant Examiner—James R. Bidwell
Attorney, Agent, or Firm—Sughrue, Mion, Zinn, Macpeak & Seas

[57] ABSTRACT

A twist correction device for a pipe conveyor having an endless transfer belt whose at least part is rounded in a pipe shape enclosing therein a material to be transferred. The device includes a plurality of correction rollers obliquely inclined relative to the transfer direction of the transfer belt and in pressure contact with the outer circumferential surface of the pipe-shaped transfer belt to apply correcting force to the belt for correcting twisting of the belt. The device further includes two roller support frames supporting the plurality of correction rollers and pivotally connected to a stationary support frame rotatably about axes perpendicular to the transfer direction of the transfer belt. The device includes an angle adjusting device provided on the stationary support frame for adjusting rotated angles of the roller support frames about the axes, thereby correcting twisting of the pipe-shaped transfer belt. The angle adjusting device is manually driven or automatically power driven.

13 Claims, 12 Drawing Sheets

FIG_1
PRIOR ART
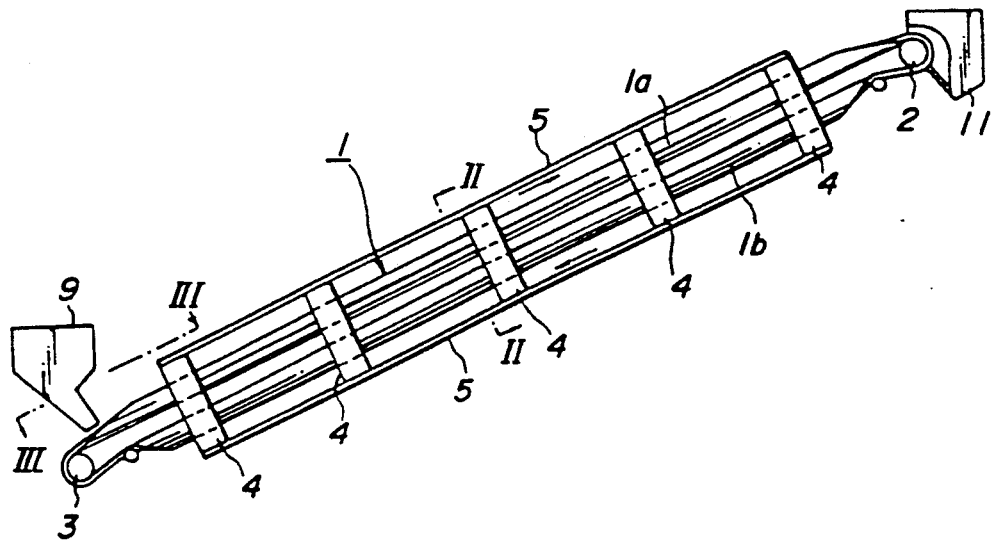
FIG_2
PRIOR ART
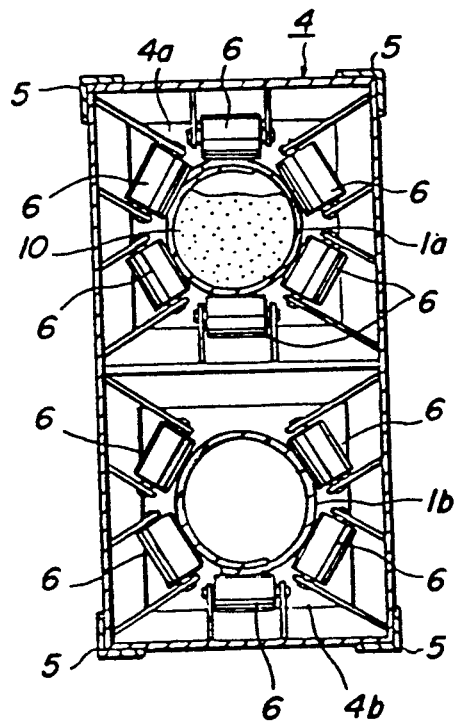

FIG_6

FIG_7

FIG_9
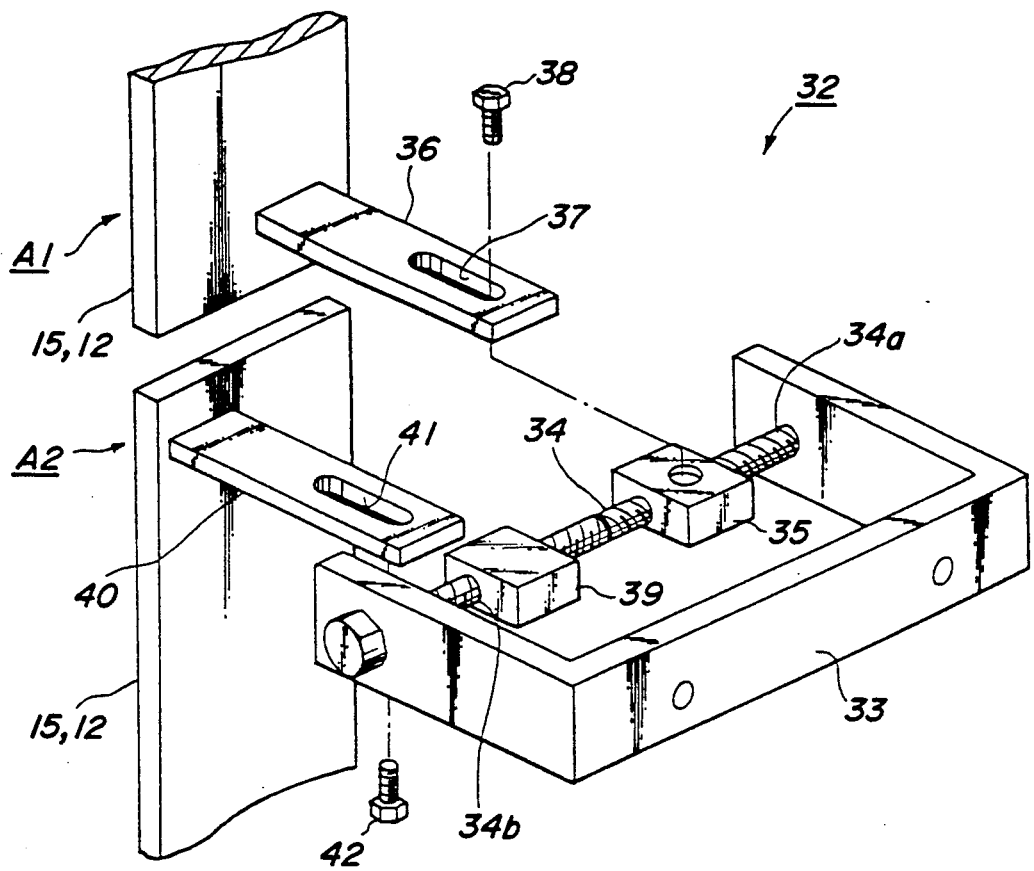
FIG_10
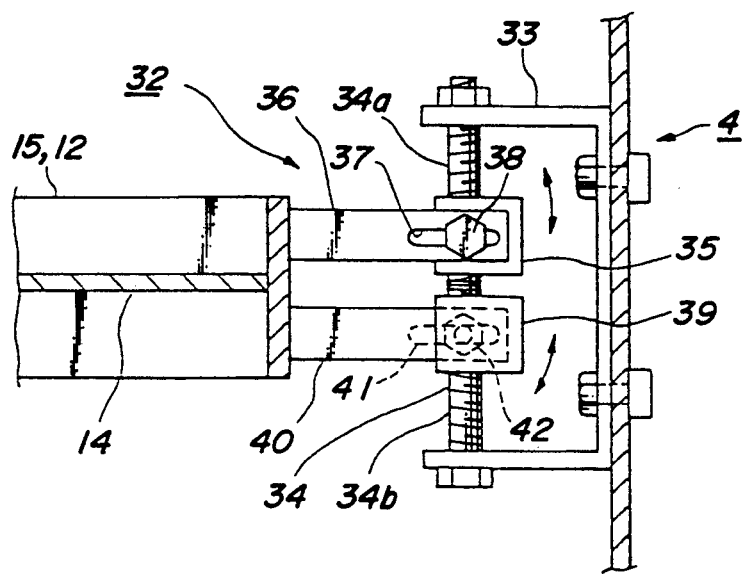

FIG_11
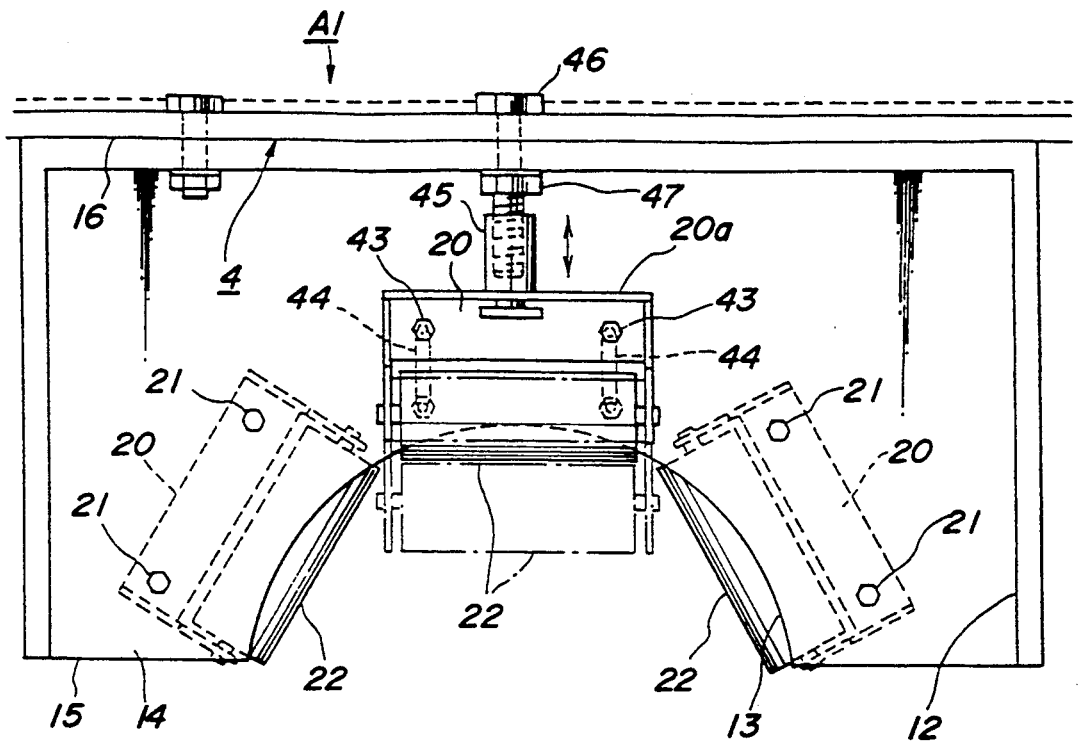
FIG_12
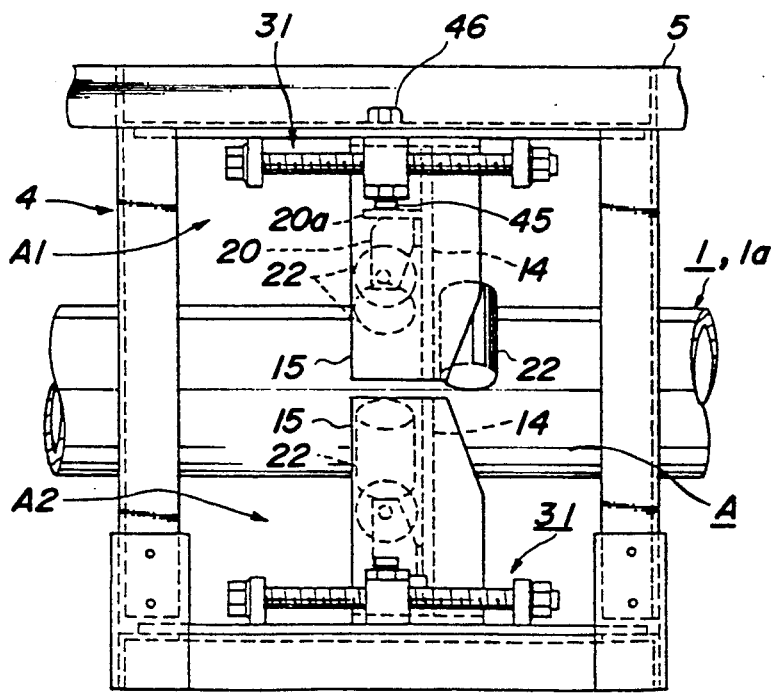

FIG_11
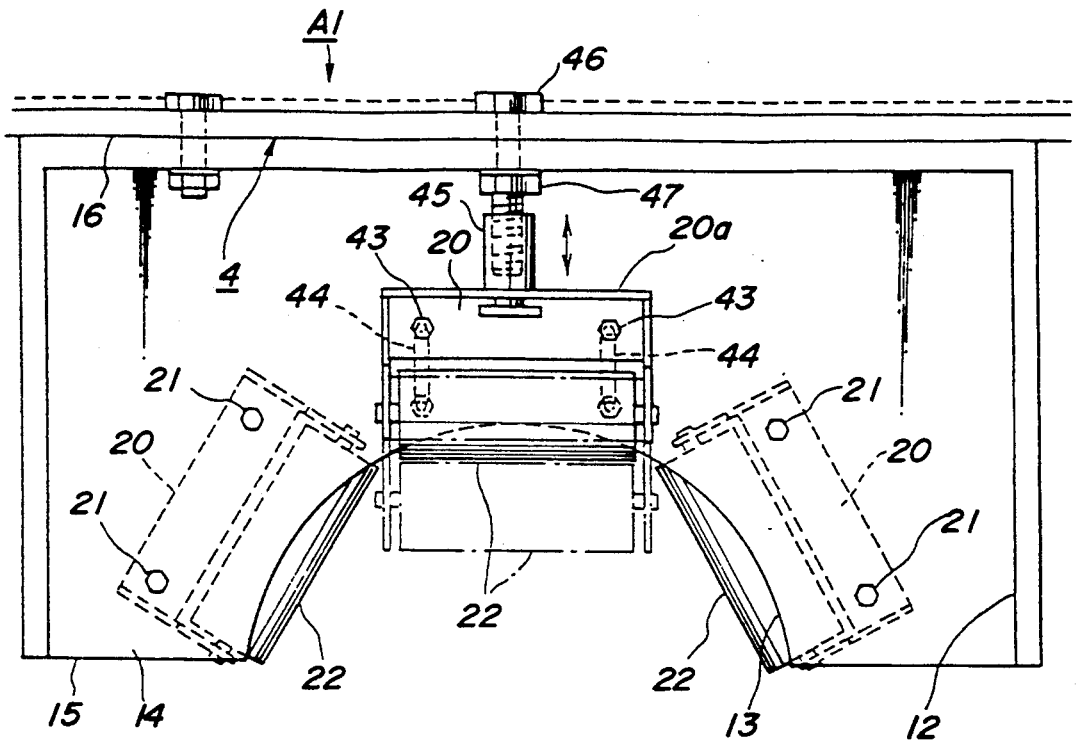
FIG_12
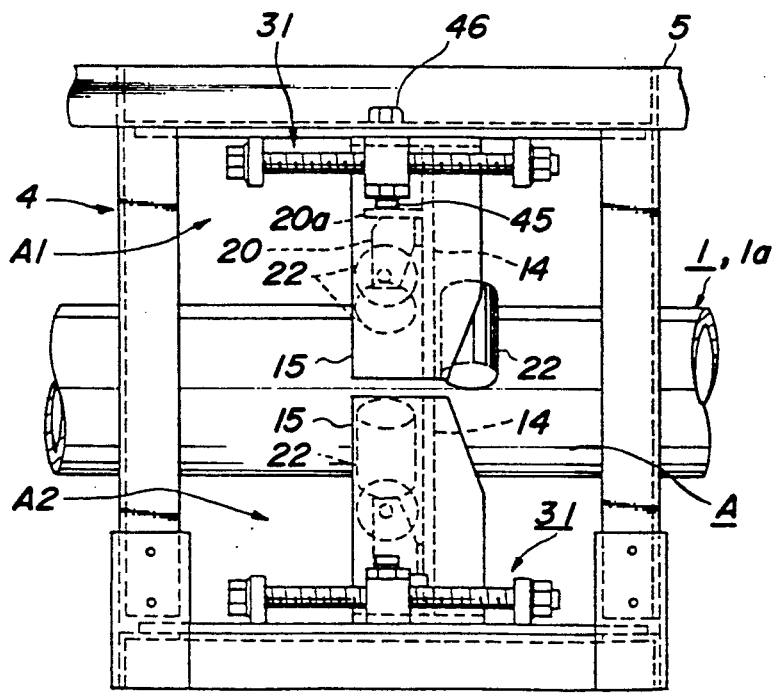

FIG_15
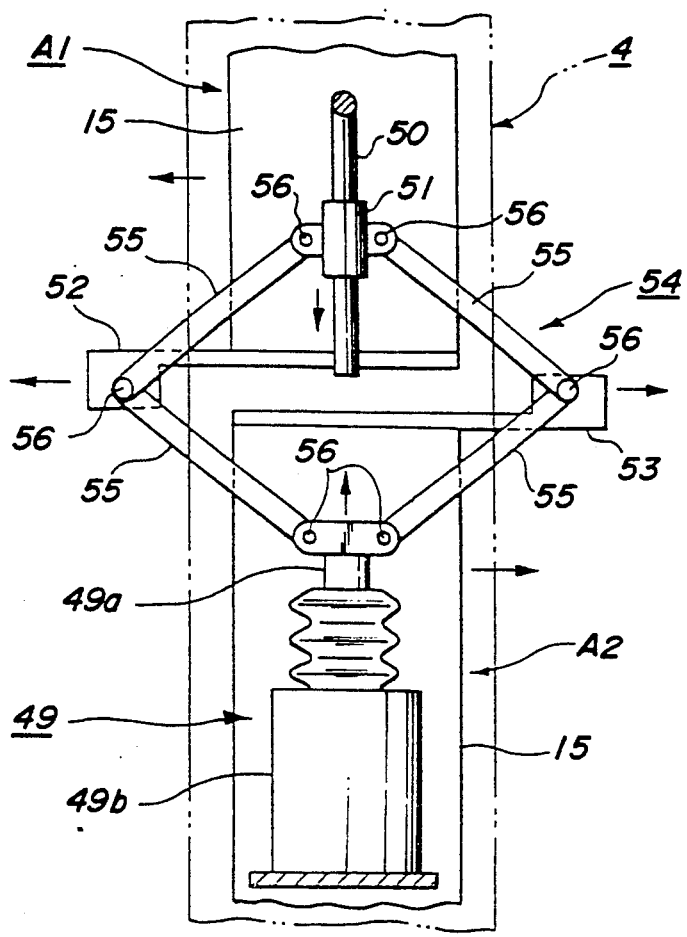
FIG_16
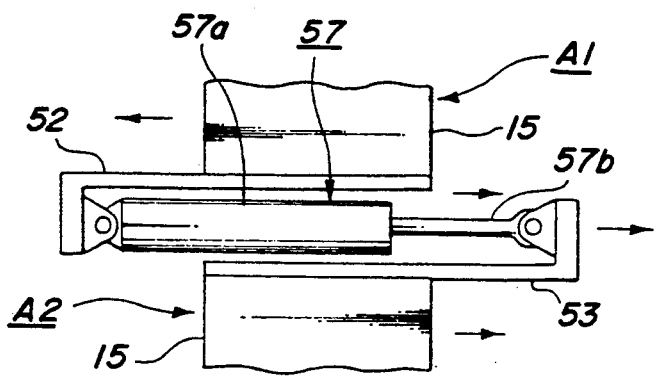

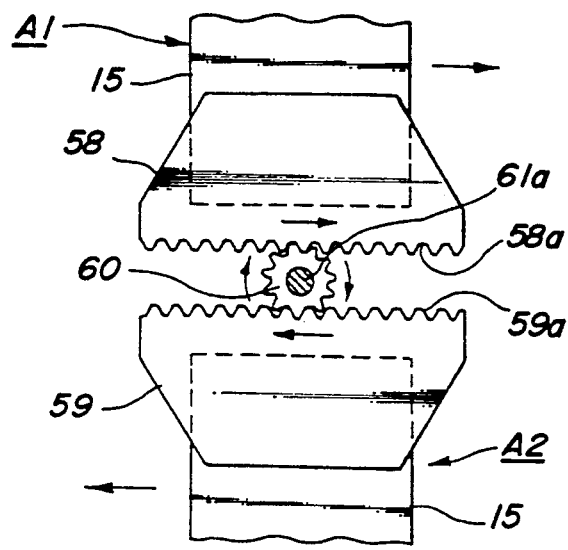
FIG_17
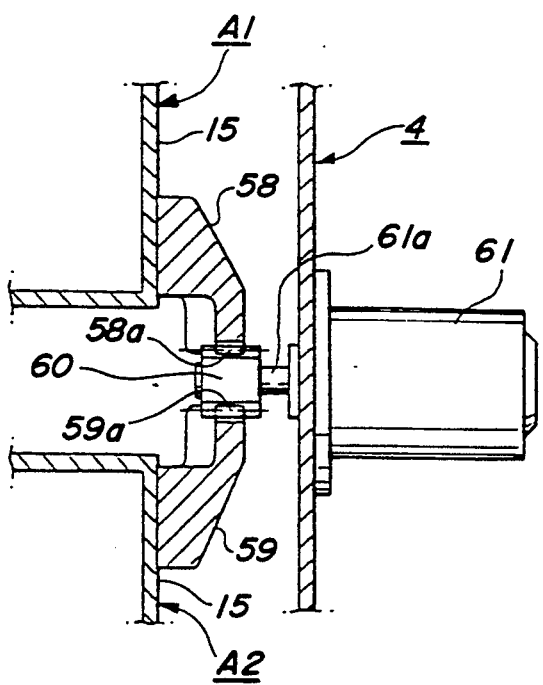
FIG_18

TWIST CORRECTION DEVICE FOR PIPE CONVEYOR

BACKGROUND OF THE INVENTION

This invention relates to a device for correcting twist of a transfer belt rounded in a pipe shape of a pipe conveyor.

A pipe conveyor has been known, whose endless transfer belt is rounded over its major part in a pipe shape into which a powdery or granular material is enclosed to be continuously transferred. FIGS. 1 to 4 illustrate such a pipe conveyor by way of example.

In the known pipe conveyor shown in FIGS. 1 to 4, an endless flexible transfer belt 1 has an elastic tendency of rounding about its longitudinal axis into a pipe shape. As shown in FIG. 1, the flexible transfer belt 1 extends around a front driving drum 2 and a rear driven drum 3 and is flattened at drums 2 and 3.

A plurality of support frames 4 each in the form of a rectangular frame are arranged in the advancing direction of the transfer belt 1 with substantially equal intervals and connected with one another by means of connecting rods 5 extending in parallel with the advancing direction of the transfer belt 1. As shown in FIG. 2, each of the support frames 4 is divided into two chambers, an upper chamber 4a in which the advancing run 1a of the transfer belt 1 passes and a lower chamber 4b in which the returning run 1b of the transfer belt 1 passes.

In each of the upper and lower chambers 4a and 4b, a plurality of shape-holding rollers 6 are rotatably supported in a circle and spaced circumferentially substantially equidistant one relative to the other.

The advancing run 1a of the transfer belt 1 in a flattened state is driven around the driven drum 3 from its lower side to the upper side and then guided by the support rollers 7 and 8 supporting the lower surface and side surfaces of the run 1a so that the advancing run 1a is progressively rounded into a trough or eavesgutter shape with the aid of its elastic tendency.

Before the advancing run 1a of the transfer belt 1 has not been rounded sufficiently, a powdery or granular material 10 to be transferred is poured onto the advancing run 1a from a hopper 9 provided above the driven drum 3.

The advancing run 1a of the transfer belt 1 is then advanced into the upper chamber 4a of the nearmost support frame 4 to be guided by the shape-holding rollers 6. As a result, the advancing run 1a of the transfer belt 1 is rounded into a pipe shape and side edges thereof are overlapped with each other on the upper side thereof to enclose the material 10 in the pipe-shaped transfer belt 1.

The pipe-shaped advancing run 1a enclosing therein the material 10 is supported on its circumference by the shape-holding rollers 6 and advances keeping its pipe shape together with the material 10 therein.

After leaving the forwardmost support frame 4 near the forward driving drum 2, the advancing run 1a passes through a belt flattening unit (not shown) during which the advancing run 1a is flattened so that the powdery or granular material 10 is poured into a receiving box 11 provided forwardly below the driving drum 2. The belt flattening unit is constructed similar to and substantially in point symmetry of the material enclosing portion shown in FIG. 3.

After leaving the driving drum 2, the returning run 1b of the transfer belt 1 is rounded into a pipe shape in the same manner as described above and passes through the lower chambers 4b of the support frames 4 to return to the driven drum 3. The transfer belt 1 is circulated around the driving and driven drums 2 and 3 in this manner.

However, in the event that the distance between the driving and driven drums 2 and 3 of the pipe conveyor is long, the pipe-shaped transfer belt 1 is frequently twisted about its longitudinal axis due to (a) wrong positions of the shape-holding rollers, (b) errors in accuracy in manufacturing the shape-holding rollers and support portions therefor and (c) irregular wear of the shape-holding rollers.

In order to overcome this problem, a correction device has been proposed for preventing or correcting the twisting of the pipe-shaped belt of a pipe conveyor. In the proposed correction device, a shape-holding roller 6 is arranged as a correction roller at a location where the transfer belt 1 rounded in the pipe shape tends to twist as shown in FIG. 4. The correction roller 6 is inclined such that one end of the roller located on the side of the transfer belt 1 tending to twist is positioned forward of the other end in the advancing direction of the transfer belt 1. In this manner, the correction roller 6 gives the transfer belt 1 twisting forces in a direction opposite to the direction in which the transfer belt 1 tends to twist, thereby preventing the twisting of the pipe conveyor.

In this correcting device, however, the correcting roller contacts the transfer belt 1 only at one point so that sufficient twisting forces could not be given to the transfer belt. In order to eliminate this disadvantage, plural correcting rollers should be provided to increase the contact points with the transfer belt to increase the twisting forces against the twisting tendency of the transfer belt.

However, the plural correction rollers must be individually inclined relative to the advancing direction of the pipe-shaped belt. This operation is very troublesome and time-consuming and an apparatus for this purpose becomes prohibitively complicated.

SUMMARY OF THE INVENTION

It is an object of the invention to provide a twist correction device for a pipe conveyor, which eliminates all the disadvantages of the prior art, and which is able to tilt a plurality of correction rollers simultaneously relative to the advancing direction of the transfer belt only by one operation of only one angle adjusting device.

In order to accomplish the object, in a twist correction device for a pipe conveyor having an endless transfer belt whose at least part is rounded in a pipe shape enclosing therein a material to be transferred, the device according to the invention comprises a plurality of correction rollers obliquely inclined relative to the transfer direction of the transfer belt and in pressure contact with the outer circumferential surface of the pipe-shaped transfer belt to apply correcting force to the belt for correcting twisting of the belt, two roller support frames supporting the plurality of correction rollers, respectively, and pivotally connected to a stationary support frame rotatably about axes perpendicular to the transfer direction of the transfer belt, and angle adjusting means provided on the stationary support frame for adjusting the rotated angles of the roller support frames about the axes, thereby correcting twisting of the pipe-shaped transfer belt.

The angle adjusting means preferably includes driving means for forcedly rotating the roller support frames about the axes. The driving means is preferably an electric motor, hydraulic cylinder or pneumatic cylinder.

When the roller support frames are rotated about the axes by means of the angle adjusting means, the plurality of correction rollers mounted on the roller support frames pivotally supported by the support frame are simultaneously inclined relative to the advancing direction of the transfer conveyor so that the respective correction rollers are brought into pressure contact with the outer circumferential surface of the transfer conveyor under inclined states. Therefore, the correction rollers give the transfer conveyor great twisting force caused by the pressure contact therewith, thereby preventing or correcting the twist of the transfer belt.

The invention will be more fully understood by referring to the following detailed specification and claims taken in connection with the appended drawings.

BRIEF DESCRIPTION OF THE DRAWINGS

FIG. 1 is a schematic side view illustrating a pipe conveyor of the prior art;

FIG. 2 is an enlarged sectional view taken along the line II—II in FIG. 1;

FIG. 9 is an exploded perspective view of the principal part of the pipe conveyor shown in FIG. 8;

FIG. 10 is a cross-sectional plan view of the principal part of the pipe conveyor shown in FIG. 8;

FIG. 11 is a cross-sectional view illustrating a principal part of the pipe conveyor having the twist correction device of the third embodiment according to the invention;

FIG. 12 is a side view illustrating the principal part of the pipe conveyor shown in FIG. 11;

FIG. 13 is a cross-sectional view illustrating a principal part of the pipe conveyor having the twist correction device of the forth embodiment according to the invention;

FIG. 15 is a side view illustrating a principal part of the pipe conveyor having the twist correction device of the sixth embodiment according to the invention;

FIG. 16 is a side view illustrating a principal part of the pipe conveyor having the twist correction device of the seventh embodiment according to the invention;

FIG. 17 is a side view illustrating a principal part of the pipe conveyor having the twist correction device of the eighth embodiment according to the invention; and FIG. 18 is a sectional front view illustrating the principal part shown in FIG. 17.

DESCRIPTION OF THE PREFERRED EMBODIMENTS

Figure 3:
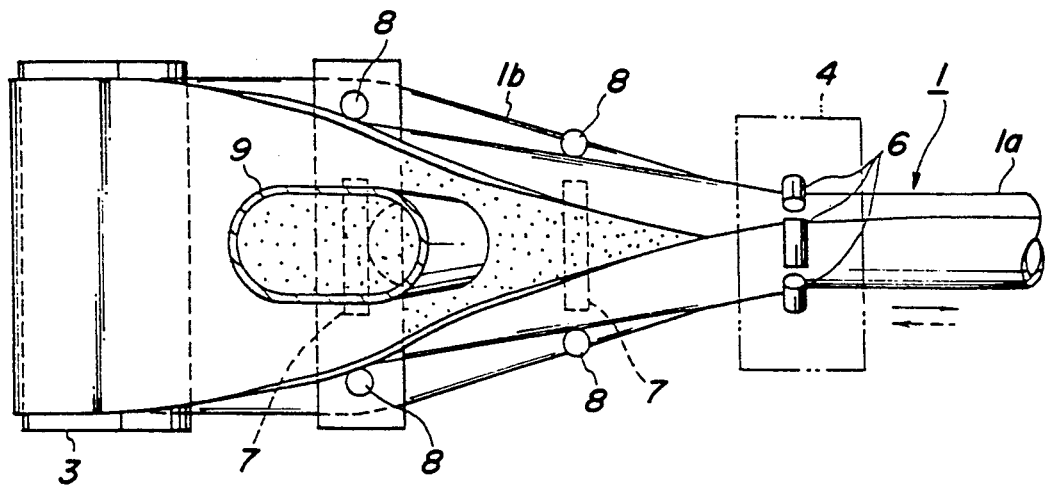
FIG. 3 is an enlarged sectional view taken along the line III—III in FIG. 1.
Figure 4:
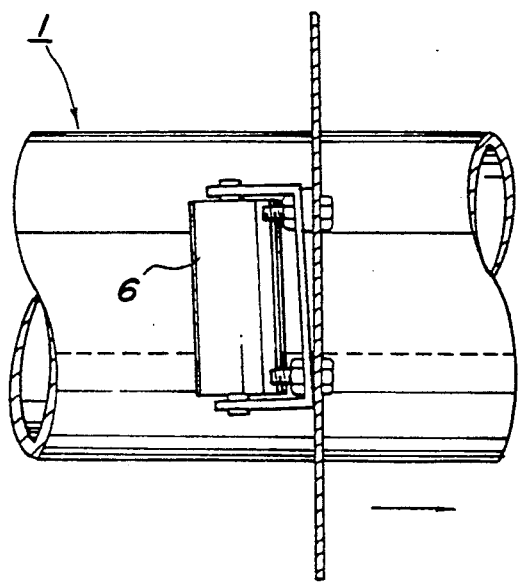
FIG. 4 is a partial plan view illustrating a twist correction device of the prior art by way of example.
Figure 5:
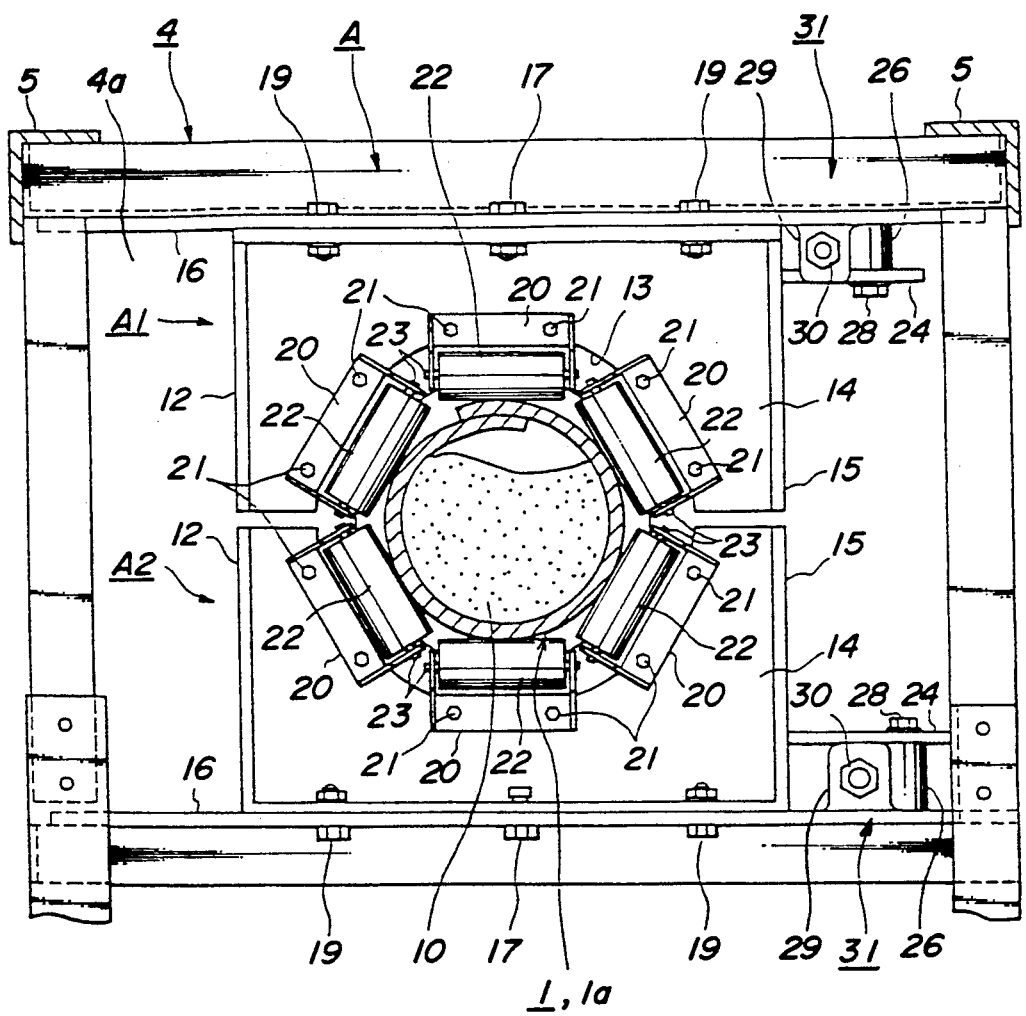
FIG. 5 is a cross-sectional view illustrating a principal part of the pipe conveyor having the twist correction device of the first embodiment according to the invention.
Figure 6:
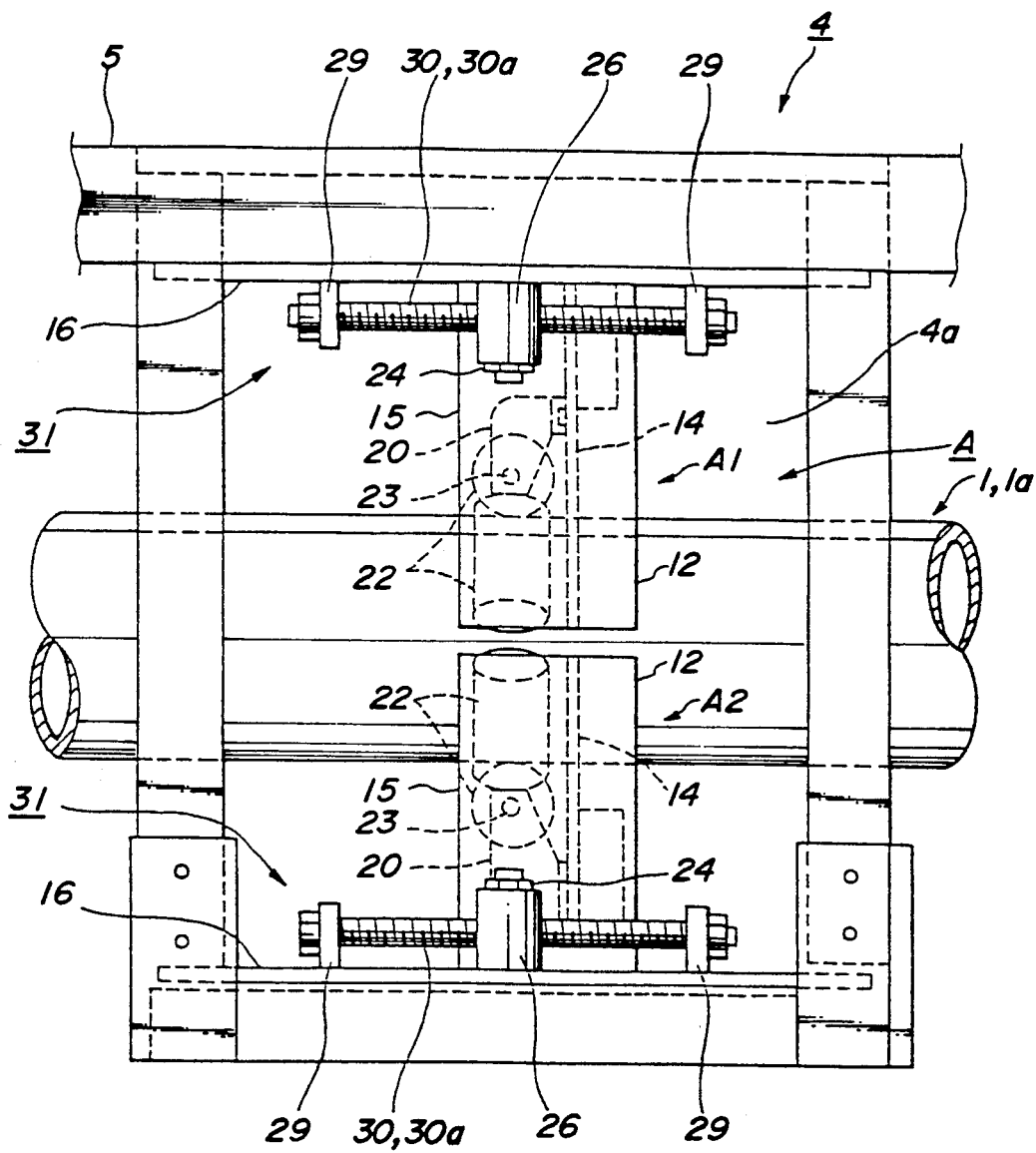
FIG. 6 is a side view illustrating the principal part shown in FIG. 5.
Figure 7:
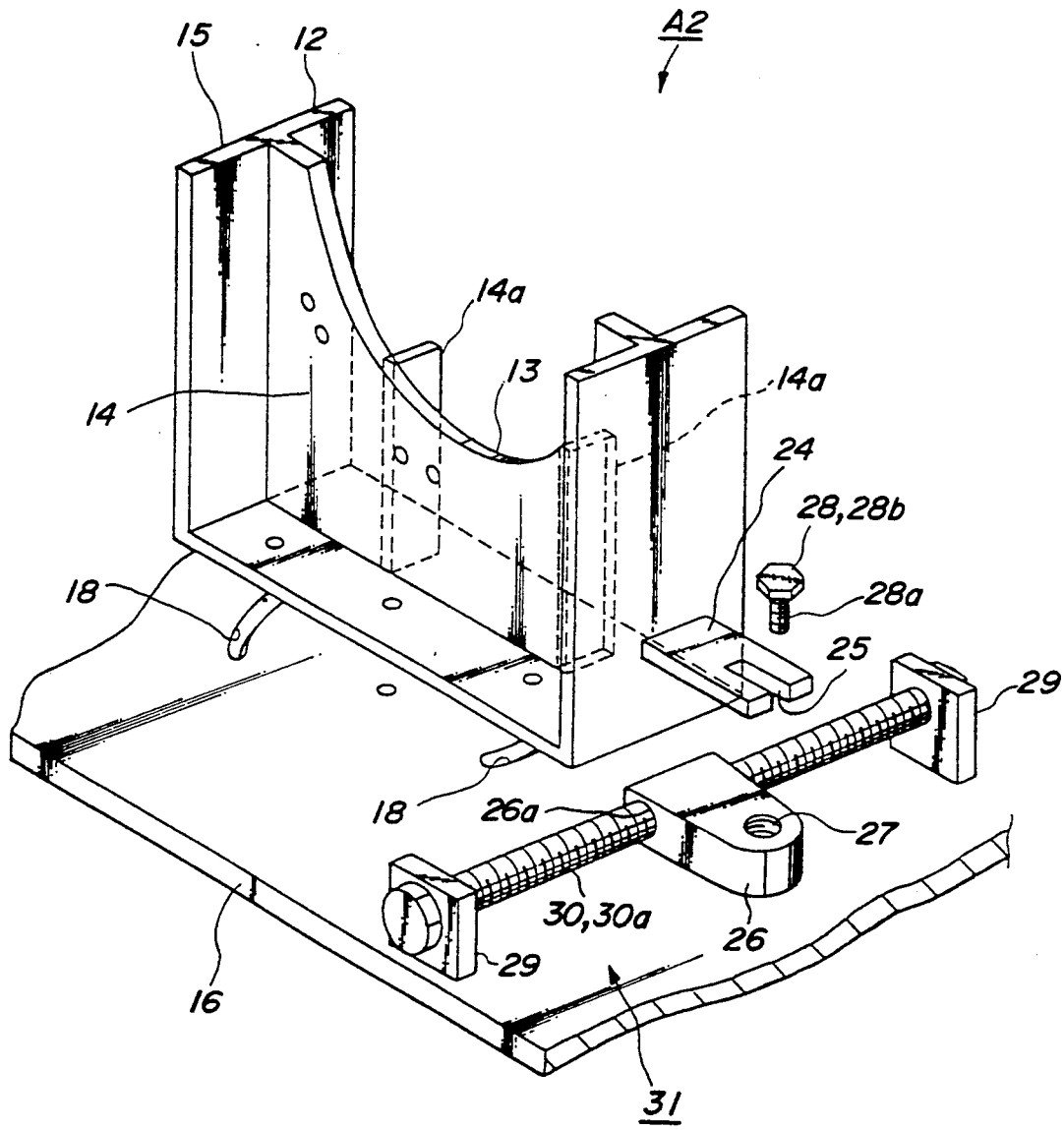
FIG. 7 is an exploded perspective view of the lower correction device of the first embodiment of the invention.

FIGS. 5 to 7 illustrate the first embodiment of the invention. Like components in the first embodiment are designated by the same reference numerals as in FIGS. 1 to 4 and will not be described in further detail.

As shown in FIG. 5, a twist correction device A including an upper correction device A1 and a lower correction device A2 is provided in the upper chamber 4a in a support frame 4 where the advancing run 1a of a transfer belt 1 rounded in a pipe shape tends to twist.

The upper and lower correction devices A1 and A2 are in mirror symmetry with each other with respect to a horizontal line between them and the like components are denoted by the same reference numerals. Only the lower correction device will be explained. As shown in FIG. 7, the lower correction device A2 comprises a roller support frame 15 having a U-shaped frame plate 12 and a vertical plate 14 fixed to the frame plate 12 and formed at its upper center edge with a semicircular opening 13. Reinforcing ribs 14a are fixed to the rear surface of the vertical plate 14.

The roller support frame 15 is pivotally connected with the bottom of its U-shaped frame plate 12 to a horizontal plate 16 at the mid portion of the support frame 4 by means of a vertical bolt and nut 17. It is fixed to the horizontal plate 16 by means of bolts and nuts 19 passing through the U-shaped frame plate 12 and through arcuate apertures 18 which are formed in the horizontal plate 16 to have a center at the bolt and nut 17.

As shown in FIGS. 5 and 6, the vertical plate 14 of the roller support frame 15 is provided on its front surface with three support bearings 20 which are spaced equal distances from each other along the arcuate edge of the semicircular opening 13 and fixed to the vertical plate 14 by means of bolts and nuts 21. Three correction rollers 22 are supported on the support bearings 20 through shafts 23, respectively, such that the correction rollers 22 are positioned somewhat radially inwardly of the arcuate edge of the semicircular opening 13.

The outer circumferential surface of the advancing run 1a of the transfer conveyor 1 is surrounded by the three correction rollers 22 of the upper correction device A1 and the three correction rollers 22 of the lower correction device A2 with substantially equally spaced distances in this manner.

On one side surface of the roller support frame 15 is provided an arm plate 24 whose bottom end is fixed to the support frame 15 and the free end is formed with a U-shaped slit 25. The U-shaped slit 25 is adapted to be fitted with the shank of a bolt 28 adapted to be threadedly engaged in the threaded aperture 27 formed in a movable member 26. The arm plate 24 is clamped to the movable member 26 by means of the head 28b of the bolt 28 threadedly engaged in the movable member 26.

The horizontal plate 16 is provided with a pair of brackets 29 vertically extending therefrom. An adjusting screw shaft 30 is rotatably supported with its ends by the brackets 29 and extends in the moving direction of the transfer belt 1. The movable member 26 has a threaded aperture 26a adapted to engage with the threaded portion 30a of the adjusting screw shaft 30 and is movable in the moving directions of the transfer belt 1 along the horizontal plate 16 by rotating the adjusting screw shaft 30 about its axis. In this manner, the arm plate 24, the movable member 26, the bolt 28, the adjusting screw shaft 30 and the like form as a whole angle adjusting means 31 for adjusting the angle of the roller support frame 15.

It is preferable that a device (not shown) similar to the twist correction device A described above is provided in the lower chamber 4b of the support frame 4 for the purpose of preventing or correcting the twist of the returning run 1b of the transfer belt 1. However, such a correction device for the returning run 1b may be omitted.

The operation and the adjusting method of the first embodiment will be explained hereinafter.

When the advancing run 1a does not undergo any twisting, the roller support frames 15 of the upper and lower correction devices A1 and A2 are fixed to the support frame 4 so that the vertical plate 14 is perpendicular to the advancing direction of the advancing belt 1a.

In such a case, the correction rollers 22 are positioned to cause their shafts 23 to extend in directions perpendicular to the advancing direction of the advancing run 1a. The correction rollers 22 are in rolling contact with the outer circumferential surface of the advancing run 1a to guide it so that the advancing run 1a advances straight in the similar manner to that of the hitherto used shape-holding rollers 6.

When any twisting or twisting tendency in the advancing run 1a occurs, after the bolts and nuts 17 and 19 and the bolts 28 have been loosened, the adjusting screw shafts 30 of the angle adjusting means 31 are rotated to move the movable members 26 along the adjusting screw shafts 30. Consequently, the roller support frames 15 of the upper and lower correction devices A1 and A2 are rotated through the same angles in opposite directions about the bolts and nuts 17, respectively. Thereafter, the roller support frames 15 inclined to the advancing direction of the advancing run 1a are fixed to the horizontal plates 16 by fastening the bolts and nuts 17 and 19 and the bolts 28.

The inclination of the roller support frames 15 relative to the twisting direction of the advancing run 1a is such that the ends of the correction rollers 22 on the side of twisting direction of the advancing run 1a of the pipe-shaped belt 1 is positioned forwardly of the other ends of the correction rollers 22 in the advancing direction of the advancing run 1a.

With this arrangement, six (three upper and three lower) correction rollers 22 give the advancing run 1a a strong correction force in a direction opposite to the twisting direction of the run 1a so that the twisting can be prevented or corrected.

It is advantageous that the pipe-shaped transfer belt 1 is embraced on the left and right sides by the correction rollers 22 in the roller support frame 15 in the first embodiment above described. The reason is that the larger the inclined angles of the roller support frames 15, the higher is the twist prevention or correction force caused by the correction rollers 22 more strongly urging the outer circumferential surface of the transfer belt 1 in a manner that the rollers 22 contact the surface.

Figure 8:
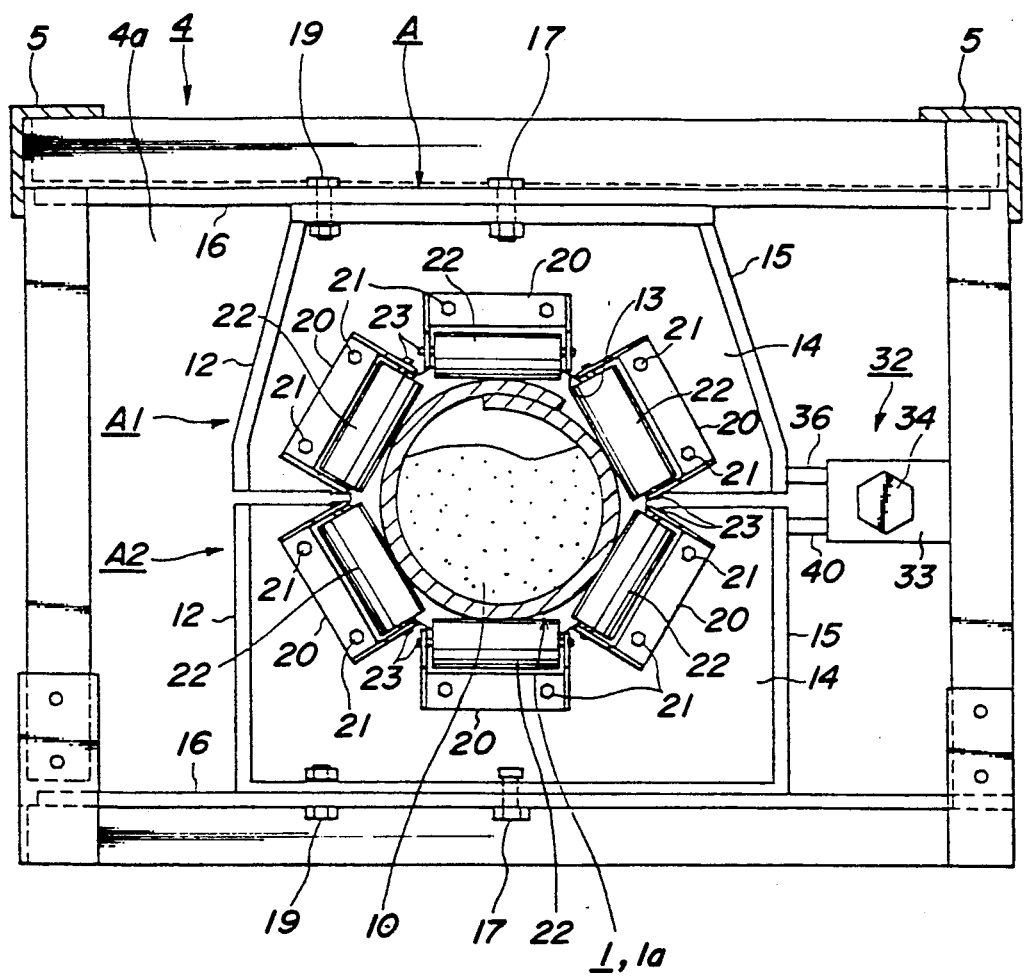
FIG. 8 is a cross-sectional view illustrating a principal part of the pipe conveyor having the twist correction device of the second embodiment according to the invention.

FIGS. 8 to 10 illustrate the second embodiment of the invention. Like components are denoted by the same reference numerals as those in the first embodiment and will not be described in further detail.

In the second embodiment, the respective inclined angles of the roller support frames 15 of the upper and lower correction devices A1 and A2 are able to be adjusted by means of single angle adjusting means 32 simultaneously in opposite directions and in synchronism with each other.

In more detail, the angle adjusting means 32 includes a U-shaped bracket 33 facing inwardly and fixed to one side surface of the upper chamber 4a of the support frame 4. An adjusting screw shaft 34 is formed with two continuous screw thread portions 34a and 34b whose threads are turned in opposite directions, respectively. The adjusting screw shaft 34 is supported with its ends by the U-shaped bracket 33 and is threadedly engaged with a movable member 35 threadedly engaged on the normal screw thread portion 34a and with a movable member 39 threadedly engaged on the reverse screw thread portion 34b.

The roller support frame 15 of the upper correction device A1 is provided with a horizontal arm plate 36 horizontally extending therefrom on the lower side surface somewhat near its rearward end, while the roller support frame 15 of the lower correction device A2 is provided with a horizontal arm plate 40 horizontally extending therefrom on the upper side surface somewhat near its forward end. A bolt 38 passes through an elongated aperture 37 formed in the horizontal arm plate 36 and extending in its longitudinal direction and is threadedly engaged in a threaded aperture formed in the upper face of the movable member 35. A bolt 42 is threadedly engaged in a threaded aperture formed in the lower face of the movable member 39 and passes through an elongated aperture 41 formed in the horizontal arm plate 40 and extending in its longitudinal direction.

With the arrangement of the second embodiment, only the rotation of the adjusting screw shaft 34 causes both the movable members 35 and 39 to move in opposite directions in synchronism with each other causing the upper and lower roller support frames 15 to rotate about the bolts and nuts 17 in opposite directions in synchronism with each other. Therefore, the adjusting operation can be more simplified.

FIGS. 11 and 12 illustrate the third embodiment of the invention. In the third embodiment, the center correction roller 22 of the upper correction device A1 is able to be adjustable vertically or in radial directions of the pipe-shaped transfer belt in a simple manner. For this purpose, bolts 43 for mounting the support bearing 20 supporting the center correction roller 22 passes through vertically elongated apertures 44 formed in a vertical plate 14. Further, the support bearing 20 is provided at its upper portion with a horizontal upper plate 20a. The lower end of a female screw member 45 is fixed to the center of the horizontal upper plate 20a.

An adjusting bolt 46 as a rotating shaft for the roller support frame 15 is provided at the center of the upper horizontal plate 16 of the support frame 4 so as to pass through the center of the upper horizontal plate 16. Moreover, the bolt 46 is threadedly engaged in the female screw member 45. With this arrangement, after loosening the bolt 43, the adjusting bolt 46 is rotated to raise or lower the support bearing 20 for the center correction roller 22. Therefore, the position of the center correction roller 22 can be adjusted simply. After the position of the center correction roller 22 has been adjusted, the adjusting bolt 46 is fixed to the support frame 4 by means of a lock nut 47 which also serves to fix the roller support frame 15 to the support frame 4.

The support bearings 20 on both sides other than the support bearing 20 for the center correction roller 22 are mounted on the rear surface of the vertical plate 14 to prevent the center correction roller 22 and the support bearing 20 therefor from interfering with the correction rollers 22 on both sides and support bearings 20 therefor.

With the construction of the third embodiment, the position of the center correction roller 22 can be simply adjusted in vertical directions, while with its adjustment the three correction rollers 22 can be brought into uniform contact with the outer circumferential surface of the advancing run 1a of the transfer belt 1 under pressure.

FIG. 13 illustrates the fourth embodiment of the invention. The twist correction device A' in the fourth embodiment is similar in construction to that obtained by rotating the correction device in the first embodiment through 90 degrees in a vertical plane. In other words, the twist correction device A' includes the right correction device A1' viewed in FIG. 13 obtained by rotating the upper correction device A1 in the first embodiment shown in FIG. 5 through 90 degrees in the clockwise direction in the drawing, and the left correction device A2' obtained by rotating the lower correction device A2 through 90 degrees in the clockwise direction in the drawing. The advancing run 1a of a transfer belt 1 is surrounded by the six (3×2) correction rollers 20 supported by the roller support frames 15 of the right and left correction devices A1' and A2'.

Other components of constitution and operation of the fourth embodiment are substantially similar to those in the first embodiment. Moreover, the fourth embodiment can bring about the same effect as that of the first embodiment.

Figure 14:
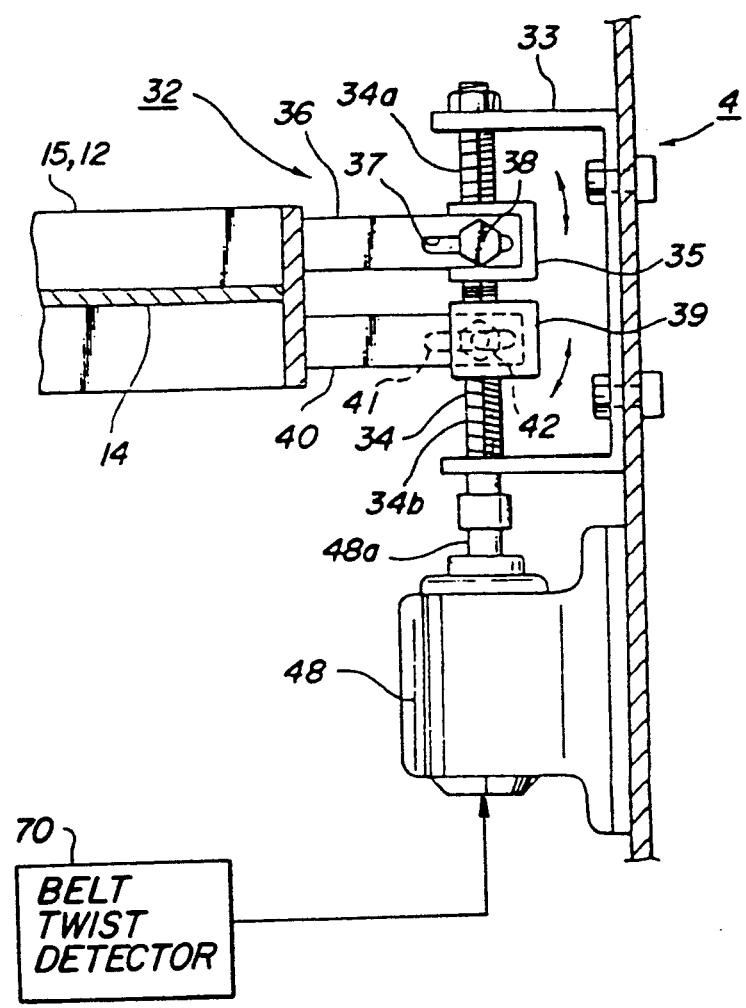
FIG. 14 is a cross-sectional plan view illustrating a principal part of the pipe conveyor having the twist correction device of the fifth embodiment according to the invention.

FIG. 14 illustrates the fifth embodiment of the invention. In the fifth embodiment, the adjusting screw shaft 34 in the second embodiment shown in FIG. 10 is connected to the rotary shaft 48a of a reversible motor 48 (driving means) fixed to the inner surface of the support frame 4. With this arrangement, the adjusting screw shaft 34 is rotated through a desired number of rotations in a desired direction. It is preferable that the motor 48 is a step-motor which is controlled with the aid of a known twist detecting device 70 which is able to automatically detect directions and amount of twisting of the transfer belt 1. The other constitution of the fifth embodiment is substantially similar to that in the second embodiment. However, members corresponding to the bolts and nuts 19 in the second embodiment may be saved or may be loosened if they are provided. Moreover, members corresponding to the bolts and nuts 38 and 42 are loosened.

In the fifth embodiment, the roller support frames 15 can be rotated by means of the motor 48 without human power. Moreover, the twist correction device has an advantage in that it can be automatically controlled in conjunction with the known twist detecting device.

FIG. 15 illustrates the sixth embodiment of the invention. To the inner surface of the support frame 4 is fixed a known motor driven jack 49 (driving means) whose support head 49a is adapted to extend and retract above its main body 49b. Moreover, to the inner surface of the support frame 4 is fixed the upper end of a guide rod 50 extending vertically and immediately above the support head 49a. Four points for forming a rhombic link mechanism are the support head 49 of the motor driven jack 49, a slide member 51 slidably fitted on the guide rod 50, the rearward end of an arm plate 52 extending rearward and fixed to the side surface of the roller support frame 15 of the upper correction device A1, and a forward end of an arm plate 53 extending forward and fixed to the side surface of the roller support frame 15 of the lower correction device A2.

These four points are connected by four link members 55 and shafts 56 extending in transverse directions to form a rhombic link mechanism 54. When the support head 49a of the motor driven jack 49 is moved toward and away from the main body 49b, the rhombic link mechanism 54 is elongated or contracted in vertical directions so that the rearward end of the arm plate 52 and the forward end of the arm plate 53 are moved toward and away from each other, with the result that the upper and lower roller support frames 15 are moved in opposite directions in synchronism with each other.

The other elements constituting the sixth embodiment are similar to that of the fifth embodiment. Moreover, the sixth embodiment can bring about the same effect as that of the fifth embodiment.

FIG. 16 illustrates the seventh embodiment of the invention. In the seventh embodiment of the invention, an arm plate 52 extending rearward is fixed to the side surface of the roller support frame 15 of the upper correction device A1, while an arm plate 53 extending forward is fixed to the side surface of the roller support frame 15 of the lower correction device A2. To the rearward end of the arm plate 52 is connected the head end of the cylinder 57a of a hydraulic or pneumatic cylinder unit 57 (driving means), and the rod end of the piston rod 57b of the cylinder unit 57 is connected to the forward end of the arm plate 53. Hydraulic (or pneumatic) pressure supplied into the cylinder 57a is controlled to extend or retract the piston rod 57b from or into the cylinder 57a so that the upper and lower roller support frames 15 are moved in opposite directions in synchronism with each other.

The hydraulic cylinder unit 57 is not supported by the support frame 4. However, the correction rollers 22 supported by the upper and lower roller support frames 15 are automatically positioned at proper positions where reaction forces applied to the correction rollers 22 from the transfer belt 1 become substantially equal. Therefore, the upper and lower roller support frames 15 do not displace in an uncontrolled state.

The other element constituting the seventh embodiment are similar to that of the fifth embodiment. The seventh embodiment can bring about the same effect as that of the fifth embodiment. Moreover, the seventh embodiment has an advantage in that the construction can be simplified.

FIGS. 17 and 18 illustrate the eighth embodiment of the invention. In the eighth embodiment, to the side surface of the roller support frame 15 of the upper correction device A1 is fixed a toothed member 58 formed in its lower edge with teeth 58a which are arranged in an arcuate shape in a horizontal plane having a center at the bolt and nut 17 (FIG. 4), while the side surface of the roller support frame 15 of the lower correction device A2 is fixed a toothed member 59 formed in its upper edge with teeth 59a which are arranged in an arcuate shape in a horizontal plane having a center at the bolt and nut 17 (FIG. 4). A pinion 60 is fixed to the rotating shaft 61a of a reversible motor 61 (driving means) fixed to the support frame 4 so that the pinion 60 is in mesh with the upper and lower teeth 58a and 59a of the upper and lower toothed members 58 and 59. With this arrangement, when the pinion 60 is rotated in normal or reverse direction by means of the motor 61, the upper and lower roller support frames 15 are moved in opposite directions in synchronism with each other.

The other elements constituting the eighth embodiment are similar to that of the fifth embodiment. The eighth embodiment can bring about the same effect as that of the fifth embodiment. Moreover, the eighth embodiment has an advantage in that the construction can be simplified.

While the invention has been particularly shown and described with reference to preferred embodiments thereof, it will be understood by those skilled in the art that the other changes in form and details can be made therein without departing from the spirit and scope of the invention. For example, the invention can be modified in the following manner.

(1) Correction rollers more than two or four are provided in one roller support frame.

(2) The angle adjusting means is rotated by means of a unit other than those shown. For example, shafts for pivotally supporting the roller support frames are rotated through reduction gears by a handwheel or a motor.

As can be seen from the above description, according to the invention only by adjusting the inclined angle of only one roller support frame by means of only one angle adjusting means, the inclined angles of a plurality of correction rollers can be simultaneously by equal values so that adjusting operation can be rapidly and simply carried out.

What is claimed is:

1. A twist correction device for a pipe conveyor having an endless transfer belt whose at least part is rounded in a pipe shape enclosing therein a material to be transferred, wherein the device comprises a plurality of correction rollers obliquely inclined relative to the transfer direction of the transfer belt and in pressure contact with the outer circumferential surface of the pipe-shaped transfer belt to apply correcting force to the belt for correcting twisting of the belt, two roller support frames supporting the plurality of correction rollers, respectively, and pivotally connected to a stationary support frame rotatably about axes perpendicular to the transfer direction of the transfer belt, and angle adjusting means provided on the stationary support frame for adjusting rotated angles of the roller support frames about the axes, thereby correcting twisting of the pipe-shaped transfer belt.

2. The twist correction device for a pipe conveyor as set forth in claim 1, wherein the angle adjusting means provided for each of the roller support frames comprises an arm plate fixed to one of the roller support frames, an adjusting screw shaft rotatably supported by the support frame, a movable member movable along the adjusting screw shaft by rotating it, and fastening means for loosely connecting the arm plate and the movable member, thereby adjusting the rotated angle of the roller support frame about the axis by rotating the adjusting screw shaft.

3. The twist correction device for a pipe conveyor as set forth in claim 1, wherein the angle adjusting means comprises arm plates fixed to the roller support frames, respectively, an adjusting screw shaft rotatably supported by the support frame, movable members movable in opposite directions along the adjusting screw shaft by rotating it, and fastening means for loosely connecting the arm plates and the movable members, respectively, thereby simultaneously adjusting the rotated angles of the roller support frames about the axes by rotating the adjusting screw shaft.

4. The twist correction device for a pipe conveyor as set forth in claim 1, wherein at least one correction roller is adjustable in radial directions of the pipeshaped transfer belt relative to the relevant roller support frame.

5. The twist correction device for a pipe conveyor as set forth in claim 4, wherein said radially adjustable correction roller is arranged on one side of the relevant roller support frame, while the remaining correction rollers are arranged on the other side of the roller support frame, thereby preventing any interference with the correction rollers.

6. The twist correction device for a pipe conveyor as set forth in claim 1, wherein the two roller support frames are arranged one above the other.

7. The twist correction device for a pipe conveyor as set forth in claim 1, wherein the two roller support frames are arranged side by side in horizontal.

8. The twist correction device for a pipe conveyor as set forth in claim 1, wherein said angle adjusting means comprises driving means for rotating the roller support frames about the axes by power means.

9. The twist correction device for a pipe conveyor as set forth in claim 1, wherein the angle adjusting means comprises arm plates fixed to the roller support frames, respectively, an adjusting screw shaft rotatably supported by the support frame, a reversible motor whose output shaft is connected to the adjusting screw shaft, movable members movable in opposite directions along the adjusting screw shaft by rotating it, and fastening means for loosely connecting the arm plates and the movable members, respectively, thereby simultaneously adjusting the rotated angles of the roller support frames about the axes by rotating the adjusting screw shaft by the reversible motor.

10. The twist correction device for a pipe conveyor as set forth in claim 9, wherein said reversible motor is controlled by twist detecting means for automatically detecting directions and amounts of twisting of the transfer belt.

11. The twist correction device for a pipe conveyor as set forth in claim 1, wherein the angle adjusting means comprises a slide member movable guided by a guide rod fixed to the support frame, arm plates connected to the two roller support frames, respectively, and their free end extending in opposite directions to each other, a motor driven jack fixed to the support frame and having a support head extendable and retractable relative to the main body of the jack, and four link members, and the slide member is pivotally connected to the free ends of the arm plates by the two link members, while the support head of the motor driven jack is pivotally connected to the free ends of the arm plates by the remaining two link members to form a rhombic link mechanism, thereby simultaneously adjusting the rotated angles of the roller support frames about the axes by extending and retracting the support head relative to the main body of the motor driven jack.

12. The twist correction device for a pipe conveyor as set forth in claim 1, wherein the angle adjusting means comprises arm plates connected to the two roller support frames, respectively, and their free ends extending in opposite directions to each other, and a cylinder unit whose cylinder head end and the piston rod end are pivotally connected to the free ends of the arm plates, respectively, thereby simultaneously adjusting the rotated angles of the roller support frames about the axes by extending and retracting the piston rod relative to the main body of the cylinder unit.

13. The twist correction device for a pipe conveyor as set forth in claim 1, wherein the angle adjusting means comprises a reversible motor fixed to the support frame, a pinion connected to the rotating shaft of the reversible motor, and two toothed members each formed in one edge with teeth which are arranged in an arcuate shape in a horizontal plane and having a center at the rotating axis of the relevant roller support frame, said two toothed members being fixed to the two roller support frames, respectively, such that the teeth of the two toothed members are in opposition to each other and simultaneously in mesh with the pinion connected to the rotating shaft of the reversible motor, thereby simultaneously adjusting the rotated angles of the roller support frames about the axes by energizing the reversible motor.

* * * * *